(12) United States Patent
Rezabek (10) Patent No.: US 7,290,391 B2
(45) Date of Patent: Nov. 6, 2007

(54) CHARGE AIR COOLER DESIGNED FOR TIER 2 LOCOMOTIVE DIESEL ENGINE

(75) Inventor: Verne E. Rezabek, La Grange Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 465 days.

(21) Appl. No.: 11/039,650

(22) Filed: Jan. 20, 2005

(65) Prior Publication Data

US 2006/0288700 A1 Dec. 28, 2006

Related U.S. Application Data

(60) Provisional application No. 60/550,835, filed on Mar. 5, 2004.

(51) Int. Cl.
*F02B 29/04* (2006.01)

(52) U.S. Cl. ....................... 60/599; 60/605.3

(58) Field of Classification Search .................. 60/599, 60/605.1, 605.3
See application file for complete search history.

(56) References Cited

U.S. PATENT DOCUMENTS

| | | | | |
|---|---|---|---|---|
| 5,791,144 | A | * | 8/1998 | Thompson .................... 60/599 |
| 6,029,345 | A | * | 2/2000 | Christensen .............. 29/888.01 |
| 6,098,702 | A | * | 8/2000 | Shadbourne et al. .......... 165/69 |
| 6,427,766 | B2 | * | 8/2002 | Zobel et al. ................ 165/132 |

* cited by examiner

*Primary Examiner*—Hoang Nguyen
(74) *Attorney, Agent, or Firm*—Cook, Alex, McFarron, Manzo, Cummings & Mehler, Ltd.

(57) ABSTRACT

A charge air cooler is composed of a framed heat exchange core which is sealably attached in a selectively removable manner with any suitably shaped inlet and outlet ducts, and is, at the other sides thereof provided with cover panels which collectively necessitate that all of the hot charge air coming from the turbocharger pass entirely through the heat exchange core. In this regard, the heat exchange core is provided with a pair of opposingly disposed mounting frames, each of which being connected sealably to a commensurately sized and configured mounting flange of an inlet duct or an outlet duct.

12 Claims, 7 Drawing Sheets

CHARGE AIR COOLER DESIGNED FOR TIER 2 LOCOMOTIVE DIESEL ENGINE

CROSS-REFERENCE TO RELATED APPLICATIONS

This patent application claims the benefit of provisional patent application 60/550,835, filed on Mar. 5, 2004.

TECHNICAL FIELD

The present invention relates to charge air coolers of the type used in locomotive diesel engines for cooling air exiting the engine turbocharger, and more particularly to a charge air cooler having an absence of air by-pass therethrough.

BACKGROUND OF THE INVENTION

Locomotive diesel engines generally utilize a combustion intake turbocharger which provides combustion charge air for the engine, and which is rotatably powered by exhaust of the engine. After being compressed in the turbocharger, the combustion charge air is hot, and is in need of cooling. This cooling is supplied by a charge air cooler (sometimes also referred to as an after cooler), located downstream of the turbocharger and upstream of the engine air box combustion chamber. An example of a prior art charge air system 10 is depicted at FIGS. 1 through 3, which should be referred to respecting the following description thereof.

Figures 1, 1A:
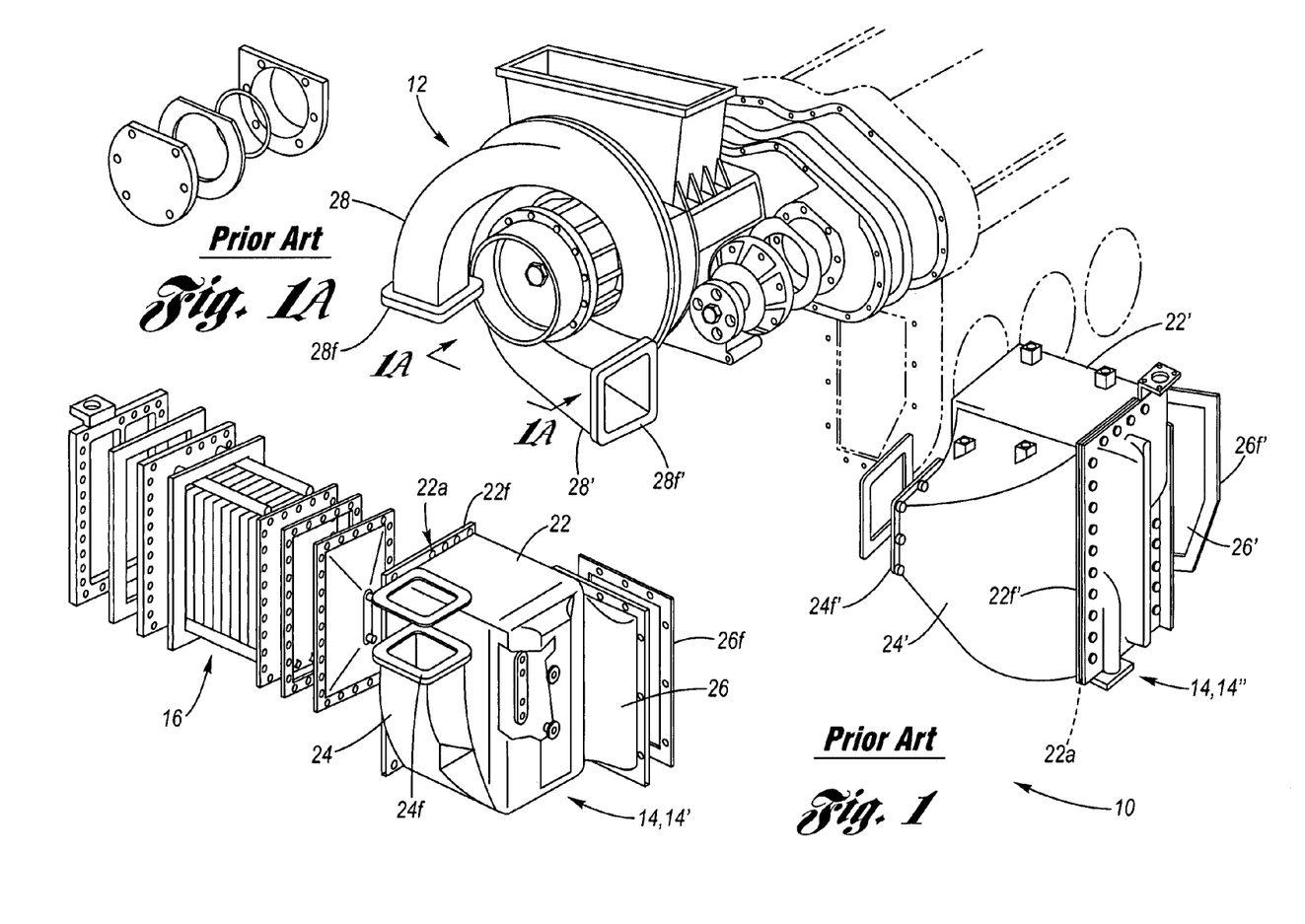
FIG. 1 is a perspective, exploded view of a prior art charge air system of a locomotive diesel engine, including pair of prior art charge air coolers and a conventional turbocharger.
FIG. 1A is a view of a subshaft cover assembly, seen along line 1A-1A of FIG. 1.
Figure 2:
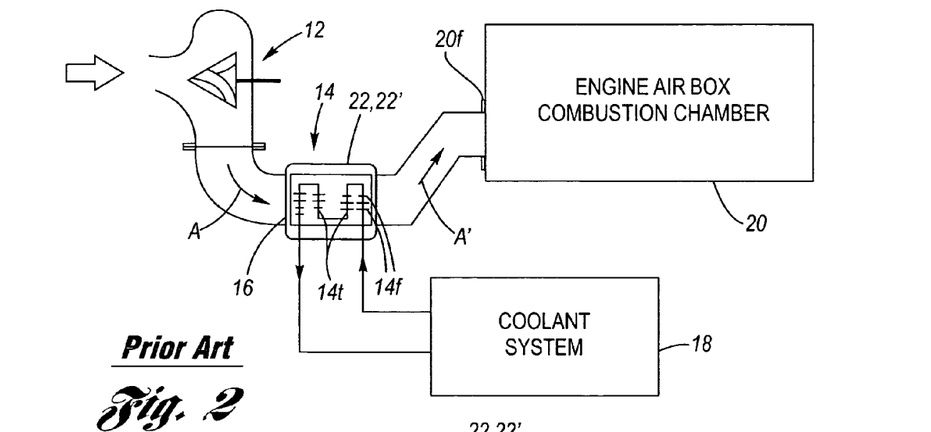
FIG. 2 is schematic view of a charge air system for a diesel locomotive, wherein a prior art charge air cooler of FIG. 1 is utilized.

Referring firstly to FIGS. 1 through 2, a turbocharger 12 is interfaced with at least one prior art charge air cooler assembly 14 (two prior art charge air cooler assemblies 14', 14" being shown at FIG. 1). The prior art charge air cooler assembly 14 includes a heat exchange core assembly 16 having a plurality of coolant tubes 14t arranged for a four-pass coolant path coolant tube arrangement, and having, for example, 26 to 27 coolant tubes deep, with a multiplicity of fins 14f connected in perpendicular relation thereto, wherein coolant (which may be liquid water or a liquid water and anti-freeze solution) circulates through the tubes via an external coolant system 18 and thereby extracts heat of the compressed charge air A from the turbocharger 12, whereupon cooled compressed charge air A' now passes to an engine air box combustion chamber 20.

Each prior art charge air cooler assembly 14, 14' further includes a cooler plenum 22, 22' an inlet duct 24, 24' integrally connected to the cooler plenum and an outlet duct 26, 26' also integrally connected to the cooler plenum. The heat exchange core assembly 16 is slid into the cooler plenum 22, 22' through a flanged opening 22a (not visible, but clearly understood from FIG. 1) and then bolted thereto at a flange 22f, 22f' of the flanged opening 22a. Additionally, each inlet duct 24, 24' has a flange 24f, 24f' for being sealingly connected to a flange 28f, 28f' of a respective outlet port 28, 28' of the turbocharger 12; and each outlet duct 26, 26' has a flange 26f, 26f' for being sealingly connected to a respective flange 20f, (two such flanges being present, but only flange 20f is shown in FIG. 2) of the engine air box combustion chamber 20.

Figure 3:
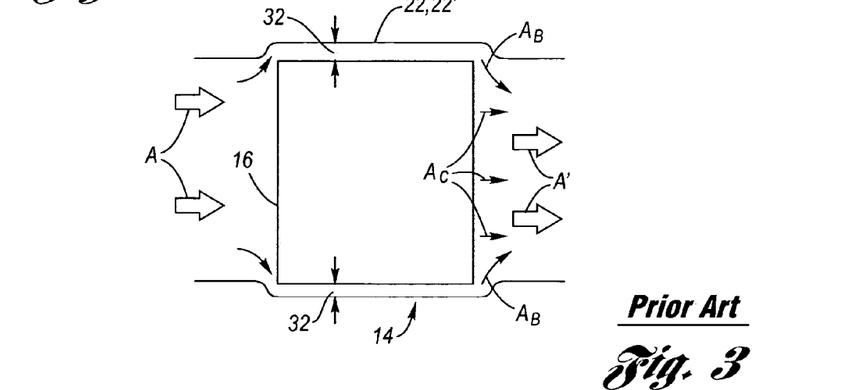
FIG. 3 is a detail view of the prior art charge air cooler of FIGS. 1 and 2, wherein by-pass charge air is permitted between the heat exchange core assembly and cooler plenum thereof.

Now, referring to FIG. 2, and with particularity to FIG. 3, it will be seen that in order for the heat exchange core assembly 16 to be slidable into the cooler plenum 22, 22', a considerable amount of peripheral open space 32 exists between the heat exchange coolant core assembly and the cooler plenum. In operation, some air $A_B$ of the hot compressed charge air A from the turbocharger 12 by-passes the heat exchange core assembly 16 and is not cooled. As a result the cooled compressed charge air A' is actually a mixture of cooled air $A_C$ that has passed through the heat exchange core assembly 16 and the by-pass air $A_B$, that is $A'=A_C+A_B$.

To the extent by-pass air $A_B$ exists, the prior art charge air cooler 14 does not do its job of providing cooling of the hot compressed charge air exiting the turbocharger. Additionally, to the extent that the inlet and outlet ducts are integral with the cooler plenum, ease of interconnection with external components of the engine is limited.

Accordingly, what is needed in the art is some configuration of a charge air cooler which eliminates by-pass air, and further which provides for easy interconnection with inlet and outlet components.

SUMMARY OF THE INVENTION

The U.S. Environmental Protection Agency (EPA) has promulgated standards which require locomotive manufacturers to comply after Jan. 1, 2005 with "Tier 2" emissions standards. As a result, there is a need to achieve about a 50% reduction in particulate emissions along with about a 30% reduction in $NO_x$, (nitrogen oxides) emissions for locomotive two-stroke internal combustion diesel engines, dictating need for engine optimization. In accordance with the Tier 2 mandate, one aspect of the locomotive diesel engine which is subject to modification in order to comply with Tier 2 emission standards is the charge air cooler so that by-pass air is eliminated, which aspect is satisfied by the improved charge air cooler according to the present invention.

The improved charge air cooler according to the present invention is designed to meet Tier 2 locomotive diesel engine standards, wherein the by-pass air is eliminated; and further, the heat exchange core is directly and readily connectable to any predetermined shape of inlet and outlet duct.

The improved charge air cooler according to the present invention includes a heat exchange core assembly which is sealably attached in a selectively removable manner with any suitably shaped, and diametrically opposed, inlet and outlet ducts such that all of the hot charge air coming from the turbocharger passes entirely through the heat exchange core. In this regard, the heat exchange core assembly has a preferably four-pass coolant path coolant tube arrangement, as for example 24 to 25 coolant tubes deep, with a multiplicity of fins connected in perpendicular relation thereto, wherein a coolant (which may be liquid water or a liquid water and anti-freeze solution) circulates through the coolant tubing via an external coolant system and thereby extracts heat of the air passing therethrough.

Accordingly, it is an object of the present invention to provide an improved charge air cooler which is designed to meet Tier 2 locomotive diesel engine standards, wherein by-pass air is eliminated; and further, the improved charge air cooler is readily connectable to any predetermined shape of inlet and outlet duct.

This and additional objects, features and advantages of the present invention will become clearer from the following specification of a preferred embodiment.

DESCRIPTION OF THE PREFERRED EMBODIMENT

Referring now to the drawings, FIGS. 4 through 9B depict an example of an improved charge air cooler 100 according to the present invention which is designed for meeting Tier 2 locomotive diesel engine standards for reduction of undesirable emissions, including $NO_x$, without sacrificing fuel consumption. Such an optimized engine is, for example, an optimized General Motors Corporation Electromotive Division 710 locomotive diesel engine equipped with, among other optimizations, the improved charge air cooler according to the present invention which serves to lower the temperature of the hot, compressed charge air coming from the turbocharger by 15% over the prior art charge air cooler assembly discussed hereinabove with respect to FIGS. 1 through 3.

Figure 4:
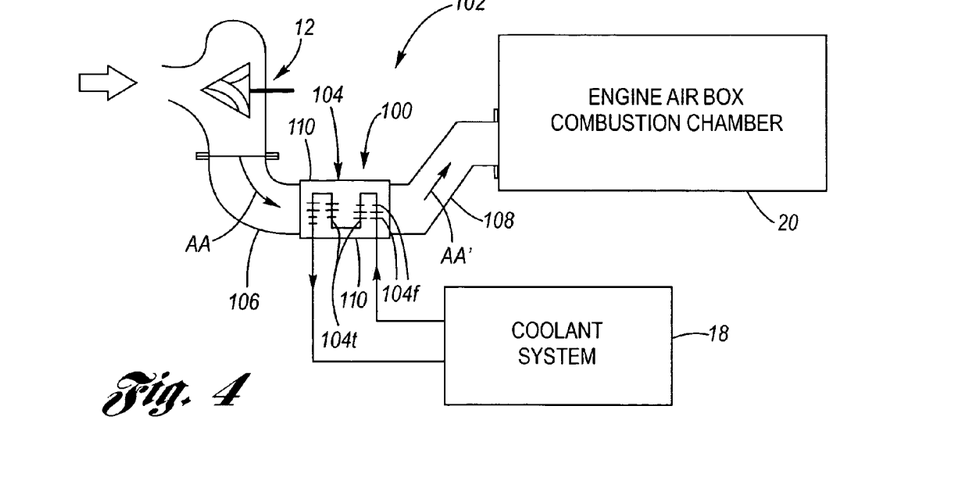
FIG. 4 is a schematic view of an improved charge air system for a diesel locomotive according to the present invention, wherein an improved charge air cooler according to the present invention is utilized.
Figure 5:
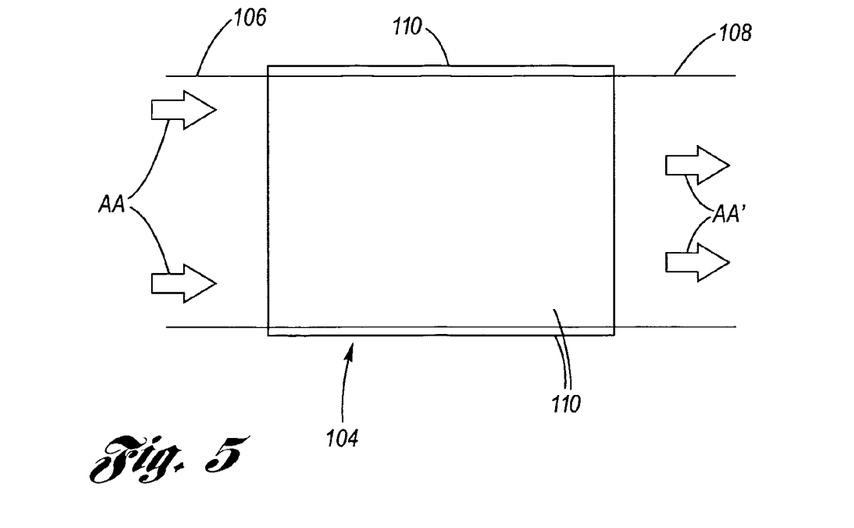
FIG. 5 is a detail view of the improved charge air cooler of FIG. 4, wherein by-pass charge air is eliminated.

FIG. 4 depicts a schematic view of a charge air system 102 which utilizes the improved charge air cooler 100. In this regard, the improved charge air cooler 100 is configured so that an improved heat exchange core 104 thereof is directly sealed with any suitably shaped inlet and outlet ducts 106, 108, and is, elsewhere, provided with cover panels 110 which thereby collectively necessitate that all of the hot charge air AA coming from the turbocharger 12 pass entirely through the heat exchange core assembly so as to provide cooled charge air AA' to the engine air box combustion chamber 20.

Figure 6A:
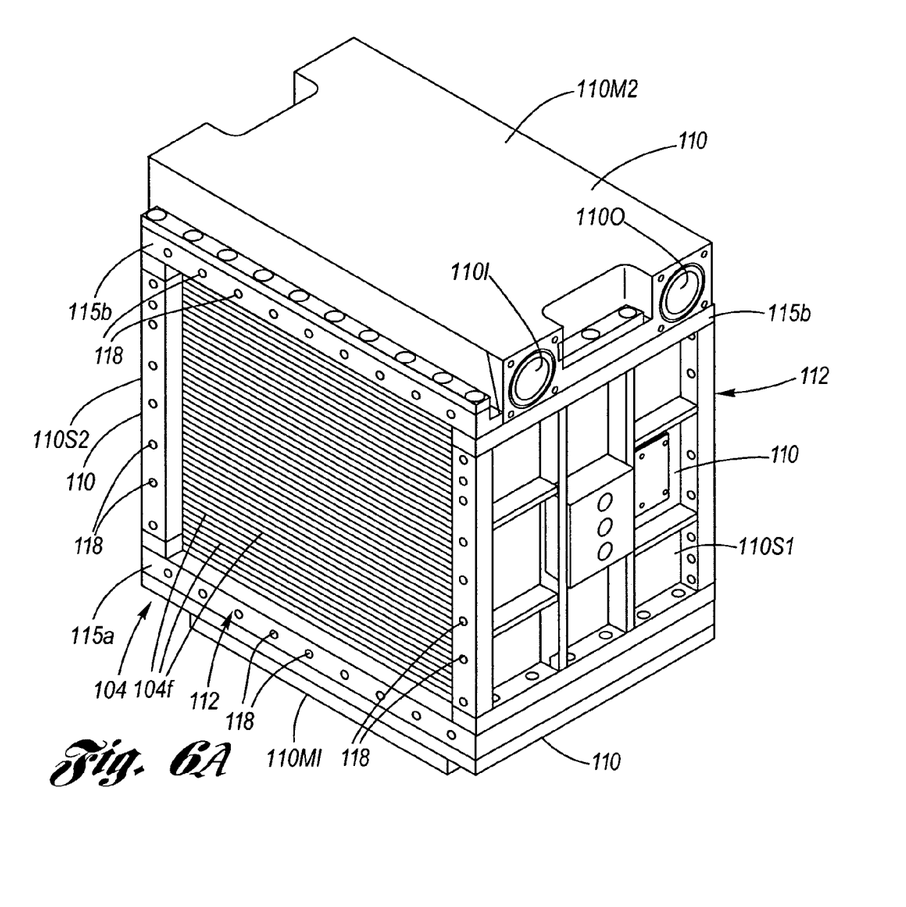
FIG. 6A is a perspective view of the improved charge air cooler according to the present invention.
Figure 6B:
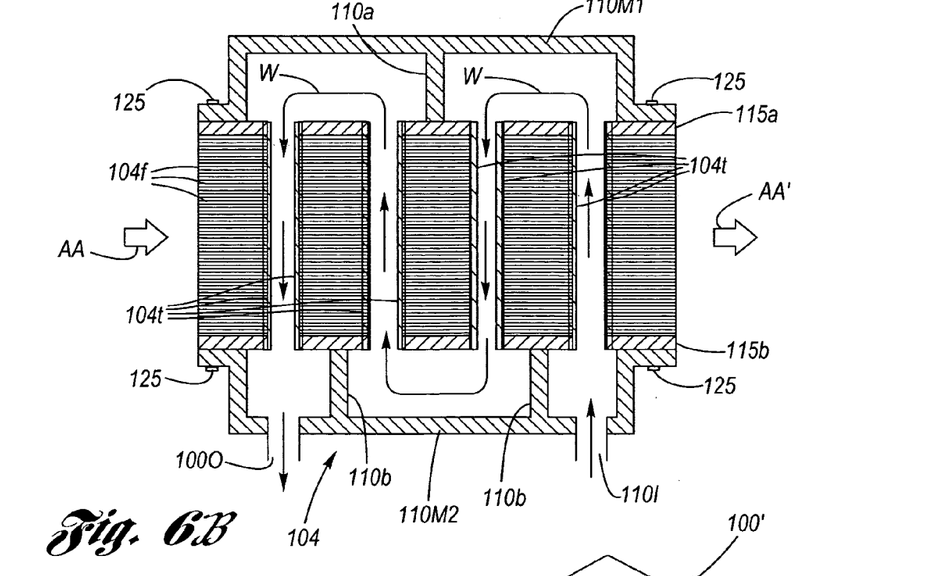
FIG. 6B is a side view of the improved charge air cooler of FIG. 6A, showing now in particular the improved heat exchange core thereof.

More particularly, the improved heat exchange core 104 of the improved charge air cooler 100 includes a plurality of coolant tubes 104t, preferably of copper, which are in intimate contact with a multiplicity of perpendicularly oriented cooling fins 104f, also preferably of copper. In this regard, it is preferred for the coolant tubes 104t to be arranged 24 to 25 coolant tubes deep in a four-pass coolant path arrangement of the coolant tubes, as shown at FIG. 6B.

A first tube sheet 115a is connected to the coolant tubes 104t adjacent a first end coolant fin 104f', and a second tube sheet 115b is connected to the coolant tubes adjacent an opposite second end coolant fin 14f'''. The cover panels 110 include a first manifold 110M1 which is connected to the first tube sheet 115a by fasteners 125 and has a single baffle 110a, a second manifold 110M2 which is connected to the second tube sheet 115b by fasteners 125 and has a pair of baffles 110b, a coolant inlet 110I and a coolant outlet 100O. In this regard, the coolant circulates along arrows W in a counterflow, four-pass coolant path (as shown at FIG. 6B), and is interconnected with an external coolant system 18 (as for example shown at FIG. 4). The cover panels 110 further include a first side cover 110S1 and a second side cover 110S2, both being connected to the first and second tube sheets by fasteners. The peripheries of the first and second side cover 110S1, 110S2 and the first and second tube sheets 115a, 115b provide a pair of generally identical, diametrically disposed mounting frames 112 having threaded fastener attachment holes 118 which are utilized to connect the inlet and outlet ducts thereto.

Operatively, coolant (which may be liquid water or a liquid water and anti-freeze solution) circulates through the coolant tubes 104t via the external coolant system 18 and thereby extracts, in cooperation with the fins 104f, heat of the compressed charge air AA coming from the turbocharger 12, whereupon the cooled compressed charge air AA' now passes to an engine air box combustion chamber 20.

The improved heat exchange core 104 is preferably optimized to increase tube rows by thirty-three percent over the heat exchange core assembly of the prior art charge air cooler assembly discussed hereinabove with respect to FIGS. 1 through 3, resulting in an increased thermal effectiveness of five percent for the improved charge air cooler over the prior art charge air cooler assembly 14. Now, when this is added to an increase in thermal effectiveness of ten percent of the improved charge air cooler 100 over the prior art charge air cooler assembly 14, due to elimination of by-pass air in the improved charge air cooler 100, a total increase in thermal efficiency of fifteen percent, as mentioned hereinabove, is realized by the present invention over the prior art.

The improved charge air cooler 100 has a preferably symmetrical six-sided box shape. In this regard, the improved heat exchange core 104 is also preferably box-shaped, having the aforementioned mounting frames 112 at diametrically opposed sides thereof for mounting thereto the inlet and outlet ducts, respectively, via the attachment holes 118, wherein a plurality of holes of mounting flanges 106f, 108f of each of the inlet and outlet ducts 106, 108, respectively, receive threaded fasteners 116 therethrough (see by way of example FIG. 7B) which then threadably engage the attachment holes 118 so as to sealingly connect each mounting frame 112 to a respective one of the inlet and outlet ducts.

When all sides of the improved heat exchange core 104 are covered by either a duct 106, 108 or a cover panel 110, the collective result is a sealed plenum 122 surrounding the improved heat exchange core 104 such that all the air flowing thereinto from the inlet duct must entirely flow out through the outlet duct, passing entirely through the improved heat exchange core, without any air by-passing the improved heat exchange core. The inlet duct 106 directs hot, compressed charge air from the turbocharger discharge to the improved charged air cooler 100, wherein one end of the inlet duct has a suitably configured turbocharger connection flange 106f' for being sealingly connected to an outlet port of the turbocharger. The outlet duct 108 directs cooled, compressed charge air from the improved charge air cooler 100 to the engine air box combustion chamber 20, wherein one end of the outlet duct has a suitably configured chamber connection flange 108f' for being sealingly connected to a port of the engine air box combustion chamber.

Since the shape of the improved charge air cooler 100 is symmetrical, the inlet and outlet ducts 106, 108 may be connected to the improved charge air cooler at selected opposing sides thereof. In this regard, the improved charge air cooler 100 may be connected in any direction to the turbocharger 12 and the engine air box combustion chamber 20, via any suitable ducting 106, 108, without altering its heat exchange characteristics. Therefore, the air direction across the improved heat exchange core 104 can be one way, or the opposite way, as desired for a particular installation, wherein the coolant flows in a perpendicular plane with respect to either direction of air flow.

The inlet and outlet ducts 106, 108 have been designed to improve air flow distribution to and from the improved charge air cooler 100, and thereby assist in the charge air cooling efficiency thereof. The inlet and outlet ducts 106, 108 also serve to support the charge air cooler 100; accordingly, the inlet and outlet ducts are configured and enhanced to withstand vibrations and shock which can cause fatigue structural failure of previous designs of the prior art charge air cooler assembly as recounted above with respect to FIGS. 1 through 3. Additionally, the improved charge air cooler 100 and the inlet and outlet ducts 106, 108 have been configured to provide ease of installation to the locomotive diesel engine, and to withstand misalignment during the installation process.

Figure 7A:
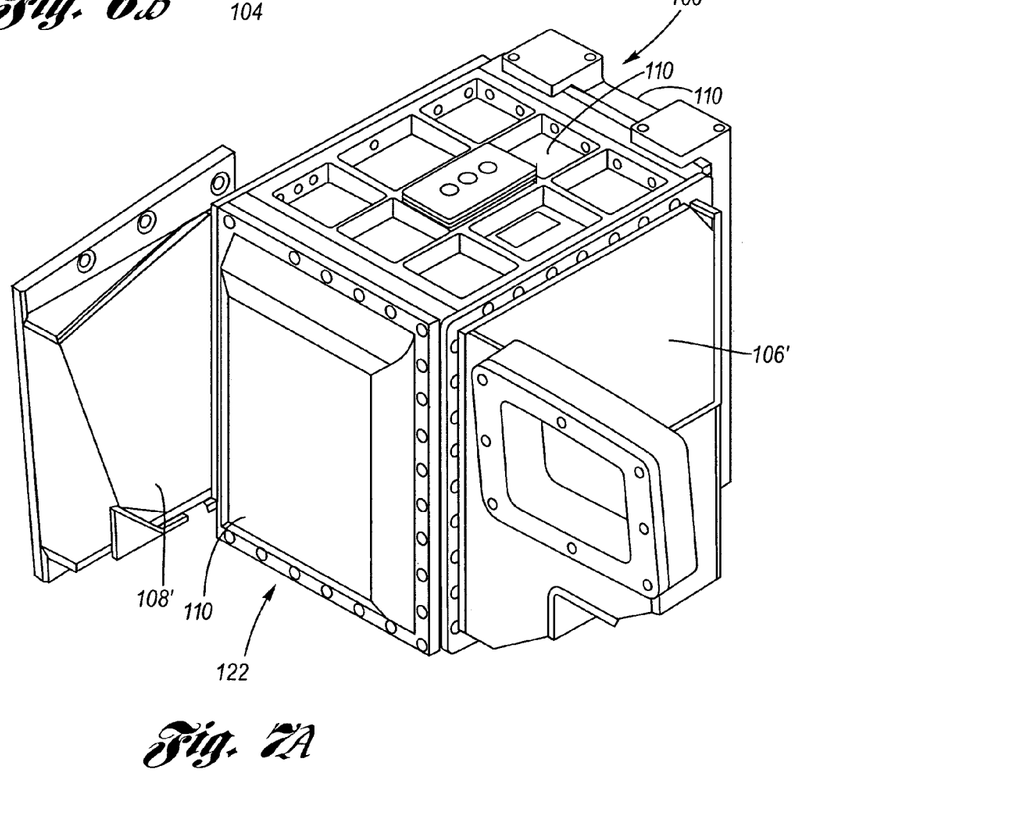
FIG. 7A is a perspective view of a first improved charge air cooler according to the present invention, inclusive of examples of intake and outlet ducts attached thereto.
Figure 7B:
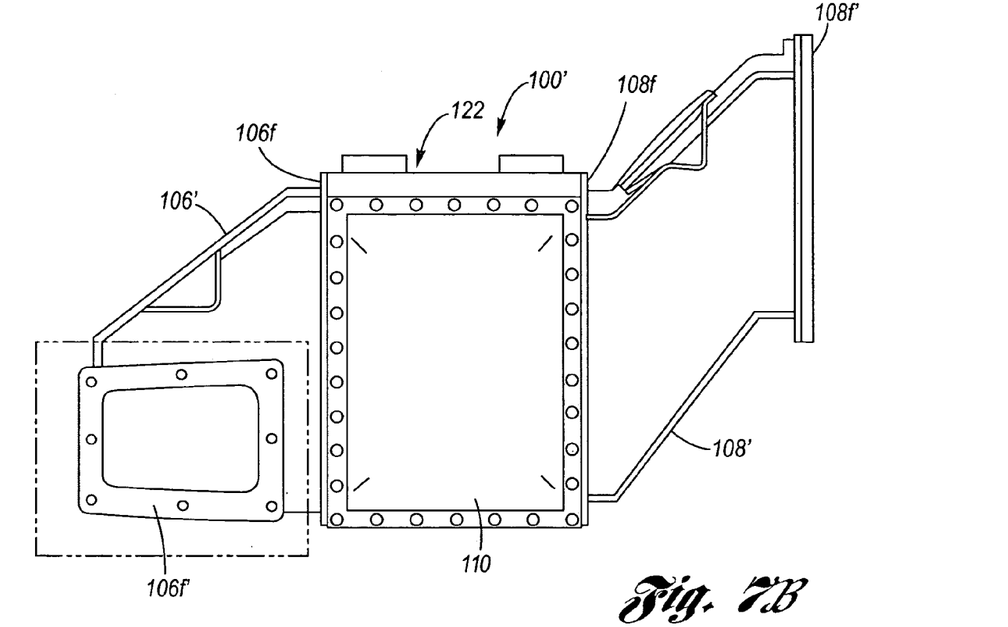
FIG. 7B is a side view of the first improved charge air cooler according to the present invention, inclusive of examples of intake and outlet ducts attached thereto.
Figure 8A:
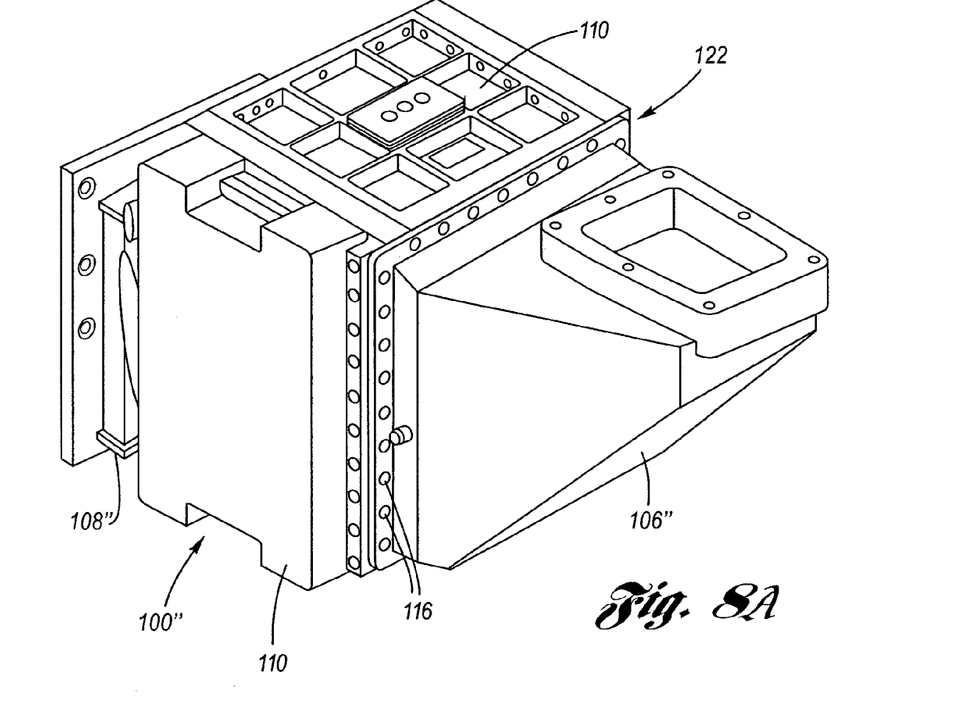
FIG. 8A is a perspective view of a second improved charge air cooler according to the present invention, inclusive of examples of intake and outlet ducts attached thereto.
Figure 8B:
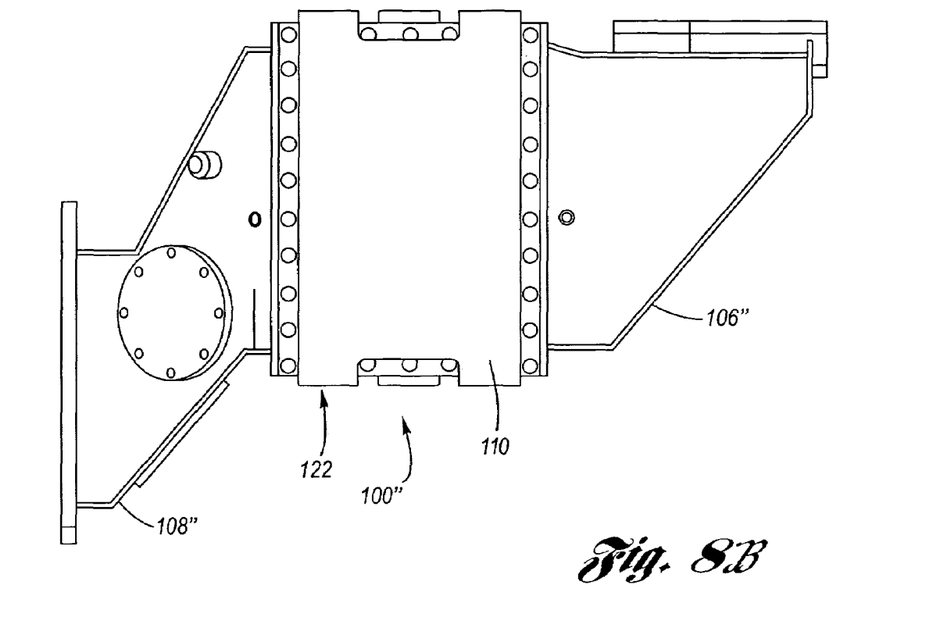
FIG. 8B is a side view of the second improved charge air cooler according to the present invention, inclusive of examples of intake and outlet ducts attached thereto.

In that it is preferred for the turbocharger 12 to have two outlet ports, it is therefore preferred to provide two improved charge air coolers 100, a first improved charge air cooler 100' as shown at FIGS. 7A and 7B which interfaces with a first outlet port 28 of the turbocharger 12 (see FIG. 1), and a second improved charge air cooler 100" as depicted at FIGS. 8A and 8B which interfaces with a second outlet port 28' of the turbocharger (see FIG. 1). It will be seen that the first improved charge air cooler 100' has associated therewith a first inlet duct 106' and a first outlet duct 108'. Additionally, it will be noted that the second improved charge air cooler 100" has associated therewith a second inlet duct 106" and a second outlet duct 108".

Figure 9A:
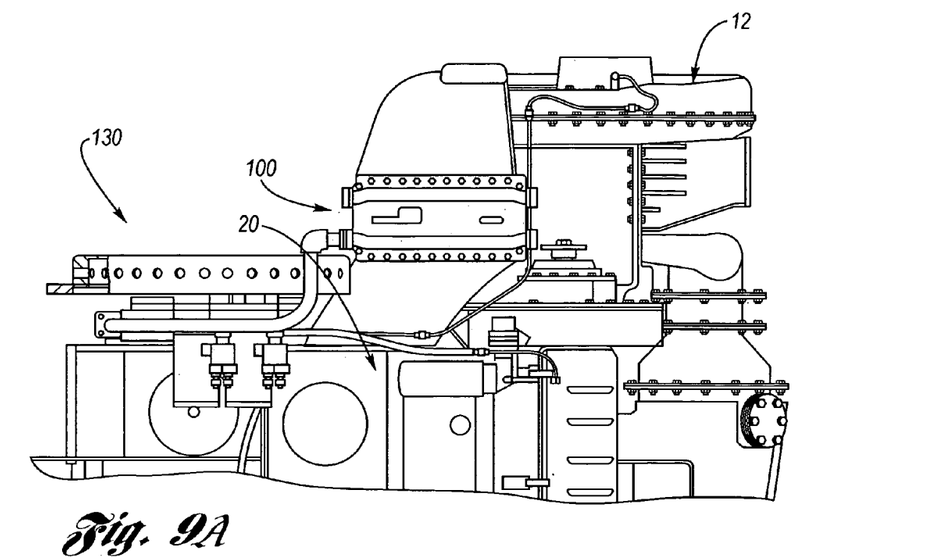
FIG. 9A is a side view of a locomotive diesel engine showing a turbocharger and one of the first and second improved charge air coolers connected to the turbocharger.
Figure 9B:
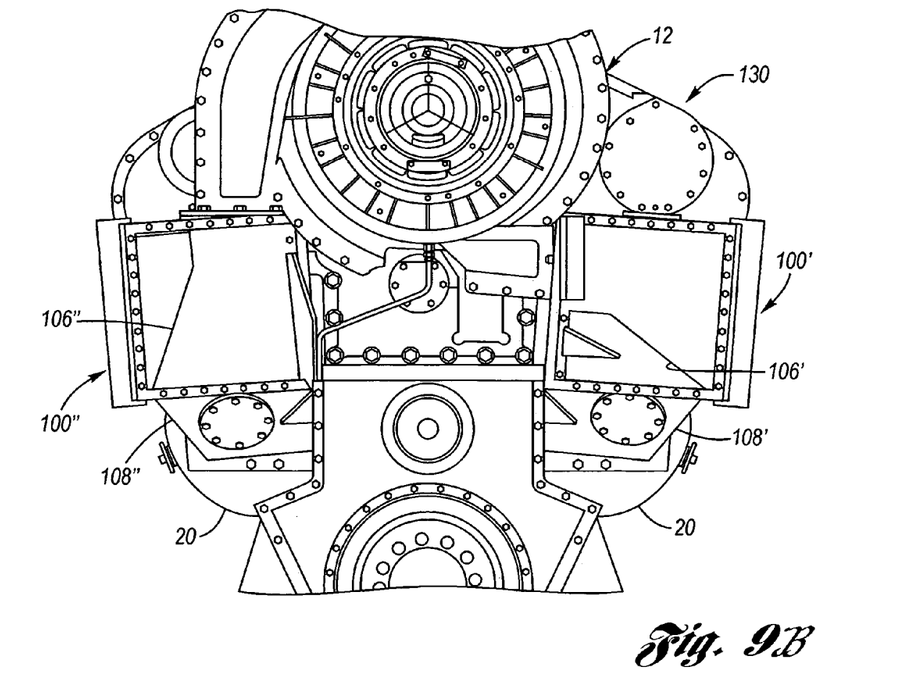
FIG. 9B is a front view of the locomotive diesel engine of FIG. 8A, now showing the turbocharger and the first and second improved charge air coolers connected to the turbocharger.

Referring now to FIGS. 9A and 9B, a typical installation example of the first improved charge air cooler 100' (and its associated first inlet and outlet ducts 106', 108') and the second improved charge air cooler 100" (and its associated inlet and outlet ducts 106", 108") are shown with respect to a turbocharger 12 and engine air box combustion chamber 20 of a locomotive diesel engine 130, such as, for example, an optimized General Motors Corporation Electromotive Division Model 710 diesel engine.

Figure 10:
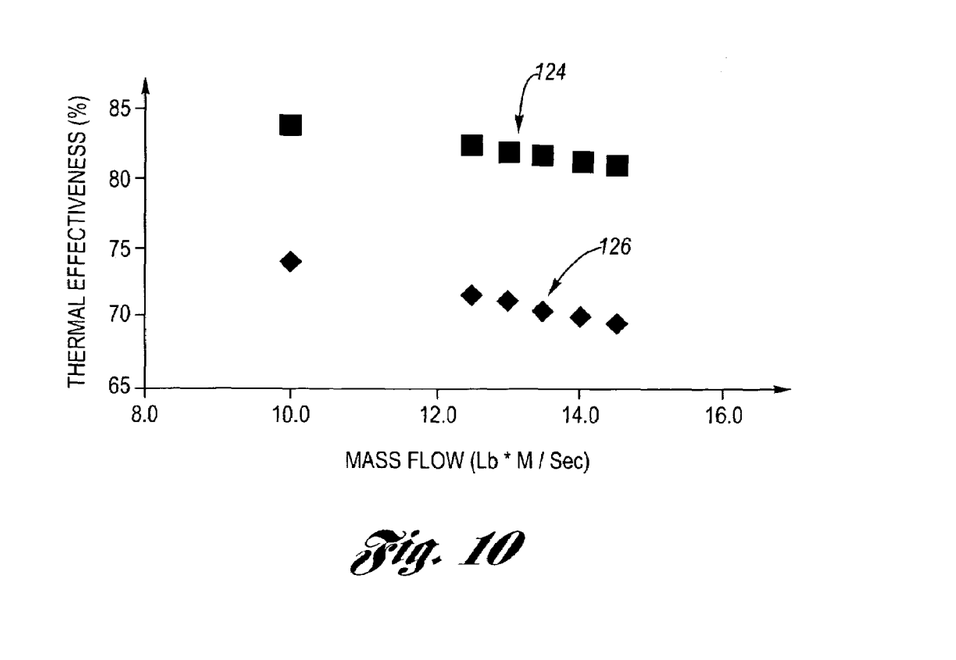
FIG. 10 is a graphical representation of plots of thermal effectiveness versus mass flow for a prior art charge air cooler and an improved charge air cooler according to the present invention.

Referring now to FIG. 10, a pair of plots of thermal effectiveness versus mass flow, wherein plot 124 is for the improved charge air cooler 100 according to the present invention, and plot 126 is for the prior art charge air cooler assembly discussed hereinabove with respect to FIGS. 1 through 3. It will be seen that the improved charge air cooler 100 is improved by at least ten percent over the prior art charge air cooler assembly.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A charge air cooler for a diesel engine for cooling charge air exiting a turbocharger before delivery of the air to an engine air box combustion chamber, wherein the turbocharger is connected to an inlet duct having an inlet flange at a free end thereof, and the engine air box combustion chamber is connected to an outlet duct having an outlet duct flange at a free end thereof, said charge air cooler comprising:

a heat exchange core having a generally box-shape defined by six sides;

a pair of mounting frames, each mounting frame being respectively located at mutually diametrically disposed sides of said six sides of said heat exchange core, wherein one said mounting frame is configured to sealingly attach to the inlet flange of the inlet duct, wherein the other said mounting frame is configured to sealingly attach to the outlet flange of the outlet duct, and wherein four sides of said six sides are free of the inlet and outlet ducts; and a plurality of cover panels, a cover panel respectively covering each side of said four free sides of said heat exchange core so that any air passing between the inlet and outlet ducts must pass entirely through said heat exchange core.

2. The charge air cooler of claim 1, wherein said heat exchange core comprises:

a plurality of coolant tubes;

a multiplicity of fins arranged between a first end fin and a second end fin, each fin being intimately connected with said coolant tubes;

a first tube sheet connected to said coolant tubes adjacent said first end fin;

a second tube sheet connected to said coolant tubes adjacent said second end fin; and said cover panels comprise:

a first manifold sealingly connected to said first tube sheet;

a second manifold sealingly connected to said second tube sheet;

a first side cover sealingly connected to said first tube sheet and said first manifold; and a second side cover sealingly connected to said second tube sheet and said second manifold;

wherein said first and second manifolds and said coolant tubes are configured for a liquid coolant to be circulated therethrough.

3. The charge air cooler of claim 2, wherein said pair of mounting frames comprise peripheries of said first and second tubes sheets and said first and second side covers.

4. The charge air cooler of claim 3, wherein said first manifold has a first baffle connected with said first tube sheet, wherein said second manifold has a pair of second baffles connected to said second tube sheet, and wherein said first and second baffles provide a four-pass coolant path in said heat exchange core.

5. A charge air cooler for a diesel engine for cooling charge air exiting a turbocharger before delivery of the air to an engine air box combustion chamber, comprising:
  an inlet duct for connecting to the turbocharger, said inlet duct having an inlet flange at a free end thereof;
  an outlet duct for connecting to the engine air box combustion chamber, said outlet duct having an outlet duct flange at a free end thereof;
  a charge air cooler comprising:
    a heat exchange core having a generally box-shape defined by six sides;
    a pair of mounting frames, each mounting frame being respectively located at mutually diametrically disposed sides of said six sides of said heat exchange core, wherein one said mounting frame is configured to sealingly attach to said inlet flange of said inlet duct, wherein the other said mounting frame is configured to sealingly attach to said outlet flange of said outlet duct, and wherein four sides of said six sides are free of said inlet and outlet ducts; and
    a plurality of cover panels, a cover panel respectively covering each side of said four free sides of said heat exchange core so that any air passing between the inlet and outlet ducts must pass entirely through said heat exchange core.

6. The charge air cooler of claim 5, wherein said heat exchange core comprises:
  a plurality of coolant tubes;
  a multiplicity of fins, arranged between a first end fin and a second end fin, each fin being intimately connected with said coolant tubes;
  a first tube sheet connected to said coolant tubes adjacent said first end fin;
  a second tube sheet connected to said coolant tubes adjacent said second end fin; and
  said cover panels comprise:
    a first manifold sealingly connected to said first tube sheet;
    a second manifold sealingly connected to said second tube sheet;
    a first side cover sealingly connected to said first tube sheet and said first manifold; and
    a second side cover sealingly connected to said second tube sheet and said second manifold;
    wherein said first and second manifolds and said coolant tubes are configured for a liquid coolant to be circulated therethrough.

7. The charge air cooler of claim 6, wherein said pair of mounting frames comprise peripheries of said first and second tubes sheets and said first and second side covers.

8. The charge air cooler of claim 7, wherein said first manifold has a first baffle connected with said first tube sheet, wherein said second manifold has a pair of second baffles connected to said second tube sheet, and wherein said first and second baffles provide a four-pass coolant path in said heat exchange core.

9. A charge air system for a locomotive diesel engine comprising:
  a turbocharger providing charge air at a port thereof;
  an engine air box combustion chamber receiving the charge air provided by said turbocharger;
  an inlet duct connected to said turbocharger, said inlet duct having an inlet flange at a free end thereof;
  an outlet duct connected to said engine air box combustion chamber, said outlet duct having an outlet duct flange at a free end thereof;
  a charge air cooler comprising:
    a heat exchange core having a generally box-shape defined by six sides;
    a pair of mounting frames, each mounting frame being respectively located at mutually diametrically disposed sides of said six sides of said heat exchange core, wherein one said mounting frame is configured to sealingly attach to said inlet flange of said inlet duct, wherein the other said mounting frame is configured to sealingly attach to said outlet flange of said outlet duct, and wherein four sides of said six sides are free of said inlet and outlet ducts; and
    a plurality of cover panels, a cover panel respectively covering each side of said four free sides of said heat exchange core so that any air passing between the inlet and outlet ducts must pass entirely through said heat exchange core.

10. The charge air cooler of claim 9, wherein said heat exchange core comprises:
  a plurality of coolant tubes;
  a multiplicity of fins, arranged between a first end fin and a second end fin, each fin being intimately connected with said coolant tubes;
  a first tube sheet connected to said coolant tubes adjacent said first end fin;
  a second tube sheet connected to said coolant tubes adjacent said second end fin;
  said cover panels comprise:
    a first manifold sealingly connected to said first tube sheet;
    a second manifold sealingly connected to said second tube sheet;
    a first side cover sealingly connected to said first tube sheet and said first manifold; and
    a second side cover sealingly connected to said second tube sheet and said second manifold;
    wherein said first and second manifolds and said coolant tubes are configured for a liquid coolant to be circulated therethrough.

11. The charge air cooler of claim 10, wherein said pair of mounting frames comprise peripheries of said first and second tubes sheets and said first and second side covers.

12. The charge air cooler of claim 11, wherein said first manifold has a first baffle connected with said first tube sheet, wherein said second manifold has a pair of second baffles connected to said second tube sheet, and wherein said first and second baffles provide a four-pass coolant path in said heat exchange core.

* * * * *